United States Patent
Li et al.

(10) Patent No.: US 11,822,715 B2
(45) Date of Patent: Nov. 21, 2023

(54) PERIPHERAL LUMINANCE OR COLOR REMAPPING FOR POWER SAVING

(71) Applicant: Apple Inc., Cupertino, CA (US)

(72) Inventors: Yang Li, San Jose, CA (US); Alexandre Chapiro, Sunnyvale, CA (US); Mehmet N. Agaoglu, Santa Clara, CA (US); Nicolas Pierre Marie Frederic Bonnier, Campbell, CA (US); Yi-Pai Huang, Cupertino, CA (US); Chaohao Wang, Sunnyvale, CA (US); Andrew B. Watson, Los Gatos, CA (US); Pretesh A. Mascarenhas, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/316,460

(22) Filed: May 10, 2021

(65) Prior Publication Data

US 2022/0011858 A1    Jan. 13, 2022

Related U.S. Application Data

(60) Provisional application No. 63/049,955, filed on Jul. 9, 2020.

(51) Int. Cl.
  *G06F 3/01* (2006.01)
  *G09G 5/10* (2006.01)
  *G09G 5/02* (2006.01)

(52) U.S. Cl.
  CPC .............. *G06F 3/013* (2013.01); *G09G 5/02* (2013.01); *G09G 5/10* (2013.01);
  (Continued)

(58) Field of Classification Search
  None
  See application file for complete search history.

(56) References Cited

U.S. PATENT DOCUMENTS 8,378,959 B2    2/2013  Yeo et al.
8,493,390 B2    7/2013  Kalinli
(Continued)

FOREIGN PATENT DOCUMENTS

WO    WO-2019122493 A1 *  6/2019  ............. G06F 3/012

OTHER PUBLICATIONS

Kim et al., "Measurements of achromatic and chromatic contrast sensitivity functions for an extended range of adaptation luminance", Dept. of Radiation Applied Life Science, Seoul National Univ., 28 Youngon-dong, Chongno-gu, Seoul, 110-744, Korea; School of Computer Science, Bangor Univ., Dean Street, LL57 1UT, United Kingdom, 2012, 14 pages.
(Continued)

*Primary Examiner* — Yi Wang
(74) *Attorney, Agent, or Firm* — Fletcher Yoder, P.C.

(57) ABSTRACT

In an embodiment, an electronic device includes a display and an eye tracker. The display includes one or more foveated areas. In the embodiment, the eye tracker is configured to collect eye tracking data regarding a gaze of one or more eyes of a user on the display. The electronic device also includes processing circuitry operatively coupled to the display. In the embodiment, the processing circuitry is configured to receive an indication of a motion associated with the gaze from the eye tracker. The processing circuitry is also configured to determine a previous location associated with the gaze during a previous frame and a target position associated with the gaze during a target frame. In the embodiment, the processing circuitry is configured to expand one or more foveated areas of the display adjacent a previous position of the gaze of the user.

20 Claims, 7 Drawing Sheets

(52) U.S. Cl.
CPC ............... *G09G 2320/0261* (2013.01); *G09G 2320/0613* (2013.01); *G09G 2320/0666* (2013.01); *G09G 2320/0686* (2013.01); *G09G 2330/021* (2013.01); *G09G 2354/00* (2013.01)

(56) References Cited

U.S. PATENT DOCUMENTS

| | | |
|---|---|---|
| 9,348,502 B2 | 5/2016 | Hwang |
| 9,870,752 B2 | 1/2018 | Plowman |
| 2010/0007589 A1* | 1/2010 | Yeo ...................... G09G 3/3413 345/83 |
| 2012/0288139 A1* | 11/2012 | Singhar ................ G06F 1/3231 382/103 |
| 2017/0287446 A1* | 10/2017 | Young .................... G09G 5/391 |
| 2018/0146198 A1* | 5/2018 | Atluru .................... G06V 20/41 |
| 2019/0147640 A1* | 5/2019 | Surti ....................... G06F 3/011 345/473 |
| 2019/0237108 A1* | 8/2019 | Davis ................. G06Q 30/0269 |
| 2020/0134780 A1* | 4/2020 | Chapiro ................ G06T 3/0093 |

OTHER PUBLICATIONS

Hansen et al., "Color perception in the intermediate periphery of the visual field", Journal of Vision, Apr. 30, 2009, doi:10.1167/9.4.26, 12 Pages.

Noorlander et al., "Sensitivity to spatiotemporal colour contrast in the peropheral visual field", https://pubmed.ncbi.nlm.nih.gov/6868374/, DOI: 10.1016/0042-6989(83)90035-4, 1983, 1 page.

* cited by examiner

PERIPHERAL LUMINANCE OR COLOR REMAPPING FOR POWER SAVING

CROSS-REFERENCE TO RELATED APPLICATIONS

This application is a non-provisional application claiming priority to U.S. Provisional Application No. 63/049,955, entitled "PERIPHERAL LUMINANCE OR COLOR REMAPPING FOR POWER SAVING," filed Jul. 9, 2020, which is hereby incorporated by reference in its entirety for all purposes.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The present disclosure relates to power saving techniques that can be used with foveated content, such as dynamically foveated content. Foveation refers to a technique in which some aspect of an image (e.g., an amount of detail, image quality, coloration, or brightness) is varied across displayed content based at least in part on a fixation point, such as a point or area within the content itself, a point or region of the content on which one or more eyes of a user are focused, or movement of the one or more eyes of the user. For example, the brightness level in various portions of the image can be varied depending on the fixation point. Indeed, in regions of the electronic display some distance beyond the fixation point, which are more likely to appear in a person's peripheral vision, the brightness may be lowered. In this way, foveation can reduce an amount of power used to display the content on the electronic display without being noticeable to the person viewing the electronic display.

In static foveation, various areas of an electronic display having different brightness levels each have a fixed size and location on the electronic display for each frame of content displayed to the user. In dynamic foveation, the various areas at different brightness levels may change between two or more images based at least in part on the gaze of the viewer. For example, as the eyes of the user move across the electronic display from a top left corner to a bottom right corner, the high brightness level portion of the electronic display also moves from the top left corner to the bottom right corner of the display. For content that uses multiple images, such as videos and video games, the content may be presented to the viewer by displaying the images in rapid succession. The high brightness and lower brightness portions of the electronic display in which the content is displayed may change between frames.

For dynamic foveation, an eye tracking system is used to determine a focal point of the eyes of the user on the electronic display. That is, a continuous input from the eye tracking system is provided to a foveation system and used to determine the size and location of the high brightness level area on the electronic display. If the eye tracking system is not able to determine a focal point of the eyes of the user or if a connection to the eye tracking system is interrupted, the areas of varying brightness levels may no longer correspond to the focal point of the eyes of the user. Without the input, the foveation system may no longer function and may cause issues with a quality of an experience of a user or viewing comfort because the high brightness area of the display maintains the same location regardless of the focal point of the eyes of the user. Thus, a failure of the eye tracking system may cause a reduction in image quality on the display as perceived by the user. However, the techniques described here may reduce an occurrence of the reduction in image quality of the image on the display. Specifically, embodiments presented herein provide techniques for foveation of a display when eye tracking is not available or when an error in eye tracking occurs.

BRIEF DESCRIPTION OF THE DRAWINGS

Various aspects of this disclosure may be better understood upon reading the following detailed description and upon reference to the drawings described below.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
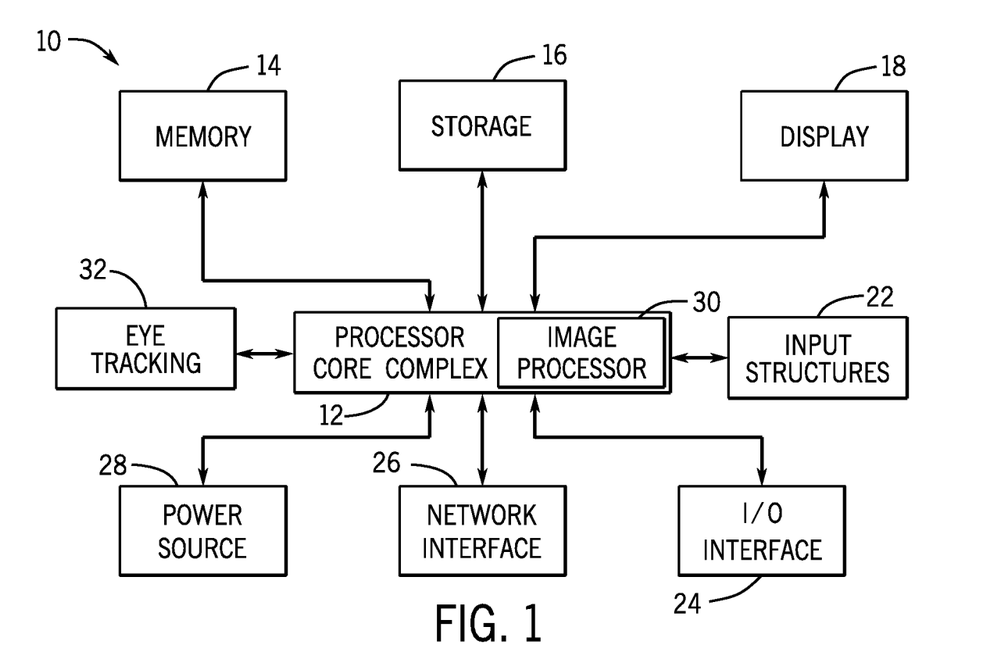
FIG. 1 is a block diagram of an electronic device with an electronic display, according to an embodiment.
Figure 2:
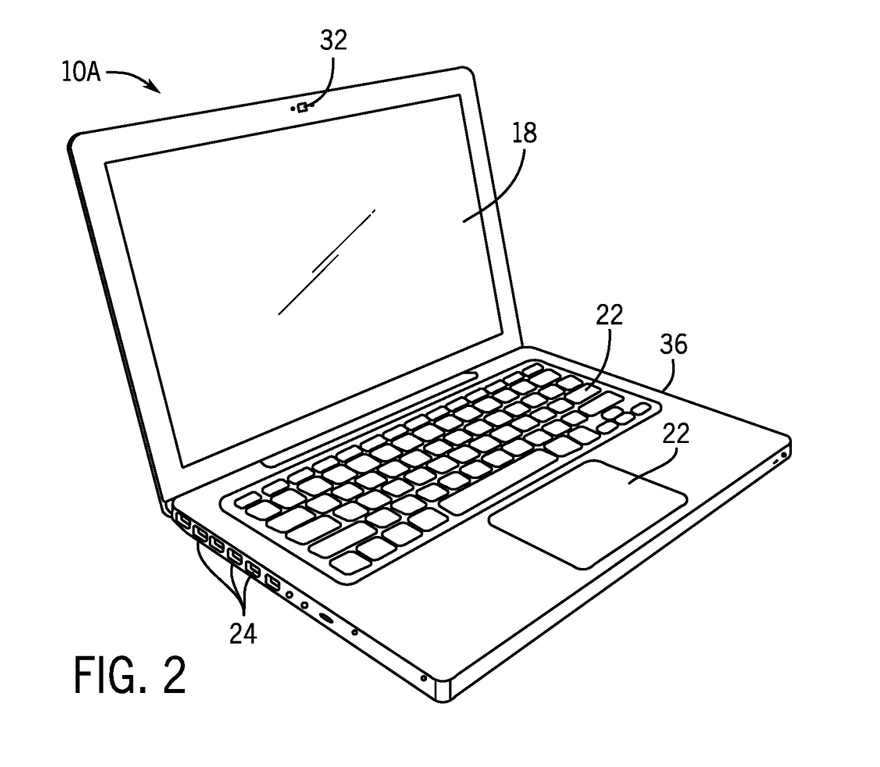
FIG. 2 is a perspective view of a notebook computer representing an embodiment of the electronic device of FIG. 1.
Figure 3:
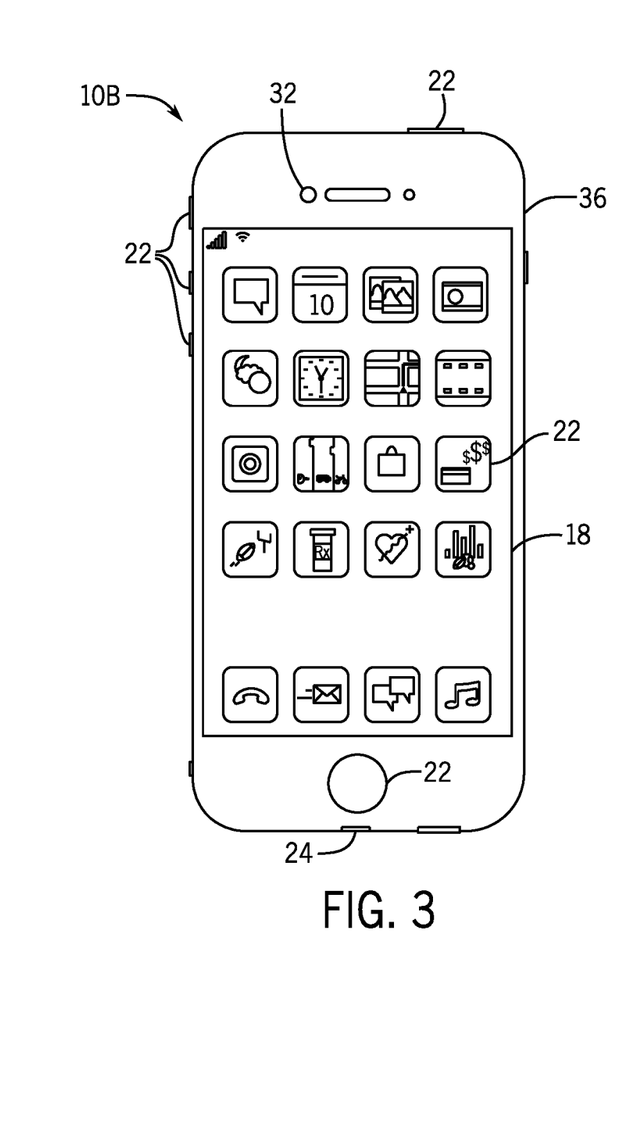
FIG. 3 is a front view of a hand-held device representing another embodiment of the electronic device of FIG. 1.
Figure 4:
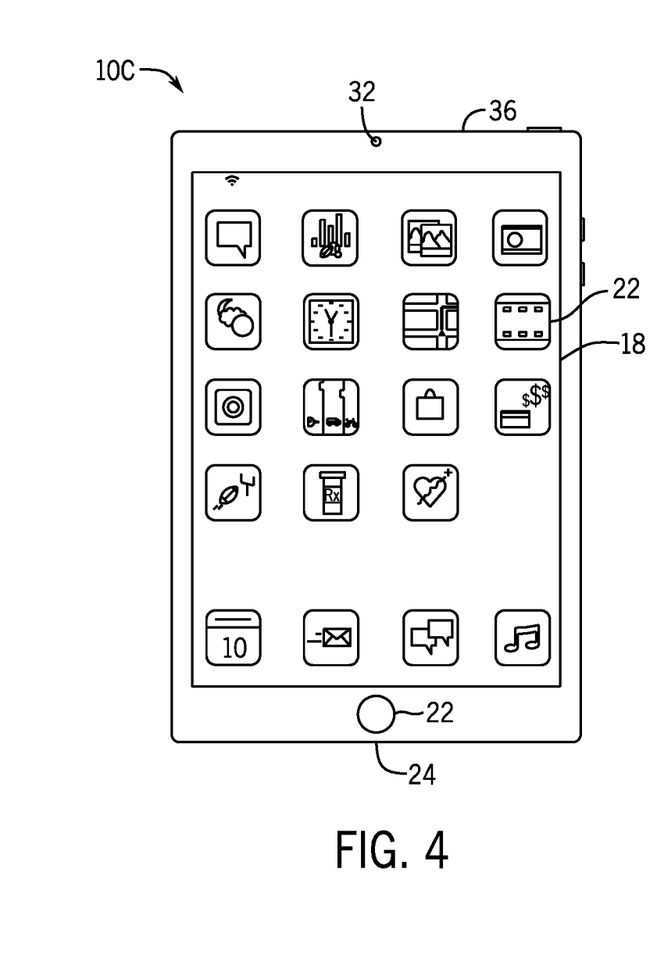
FIG. 4 is a front view of another hand-held device representing another embodiment of the electronic device of FIG. 1.
Figure 5:
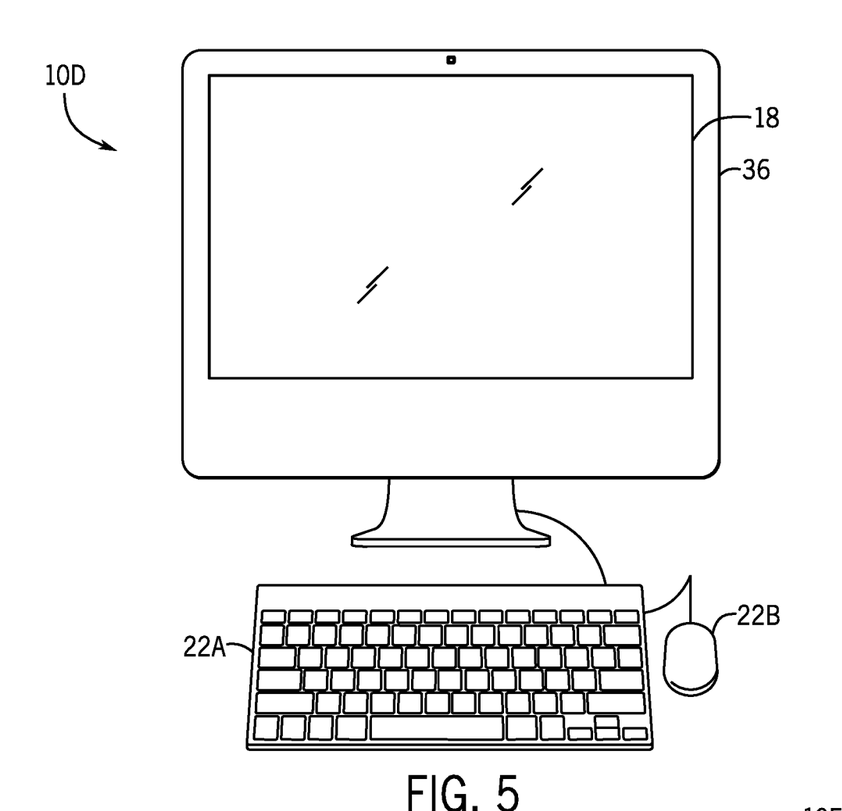
FIG. 5 is a front view of a desktop computer representing another embodiment of the electronic device of FIG. 1.
Figure 6:
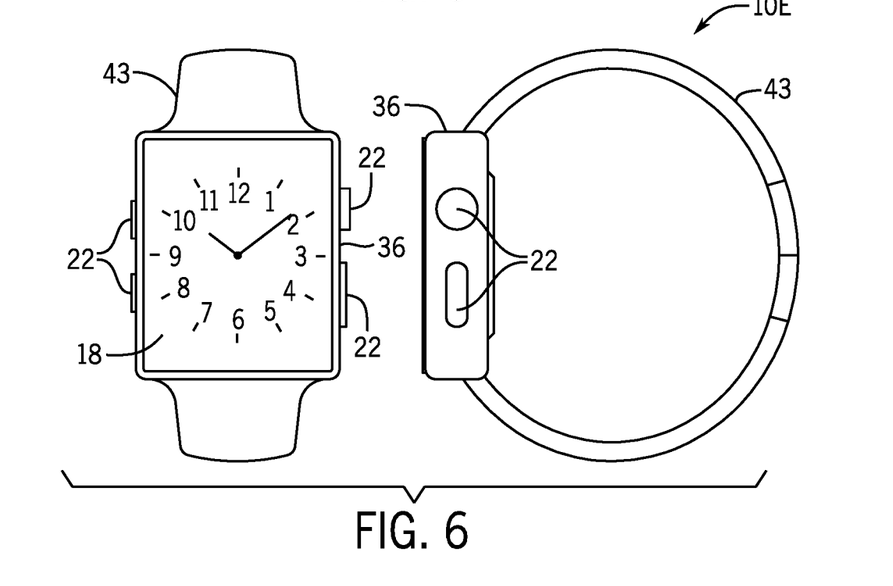
FIG. 6 is a perspective view of a wearable electronic device representing another embodiment of the electronic device of FIG. 1.

FIG. 1 illustrates a block diagram of an electronic device 10 that may provide power saving techniques for a foveated display. As described in more detail below, the electronic device 10 may represent any suitable electronic device, such as a computer, a mobile phone, a portable media device, a tablet, a television, a virtual-reality headset, a vehicle dashboard, or the like. The electronic device 10 may represent, for example, a notebook computer 10A as depicted in FIG. 2, a handheld device 10B as depicted in FIG. 3, a handheld device 10C as depicted in FIG. 4, a desktop computer 10D as depicted in FIG. 5, a wearable electronic device 10E as depicted in FIG. 6, or any suitable similar device with a display.

The electronic device 10 shown in FIG. 1 may include, for example, a processor core complex 12, a memory 14, a storage device 16, an electronic display 18, input structures 22, an input/output (I/O) interface 24, a network interface 26, a power source 28, and an eye tracker 32. The electronic device 10 may include image processing circuitry 30. The image processing circuitry 30 may prepare image data (e.g., pixel data) from the processor core complex 12 for display on the electronic display 18.

Although the image processing circuitry 30 is shown as a component within the processor core complex 12, the image processing circuitry 30 may represent any suitable hardware and/or software that may occur between the initial creation of the image data and its preparation for display on the electronic display 18. Thus, the image processing circuitry 30 may be located wholly or partly in the processor core complex 12, wholly or partly as a separate component between the processor core complex 12 and the electronic display 18, or wholly or partly as a component of the electronic display 18.

The various components of the electronic device 10 may include hardware elements (including circuitry), software elements (including machine-executable instructions stored on a tangible, non-transitory medium, such as the local memory 14 or the storage device 16, or a combination of both hardware and software elements. It should be noted that FIG. 1 is merely one example of a particular implementation and is intended to illustrate the types of components that may be present in the electronic device 10. Indeed, the various components illustrated in FIG. 1 may be combined into fewer components or separated into additional components. For instance, the local memory 14 and the storage device 16 may be included in a single component.

The processor core complex 12 may perform a variety of operations of the electronic device 10, such as generating image data to be displayed on the electronic display 18 and performing dynamic foveation of the content to be displayed on the electronic display 18. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application) stored on a suitable storage apparatus, such as the local memory 14 and/or the storage device 16.

The memory 14 and the storage device 16 may also store data to be processed by the processor core complex 12. That is, the memory 14 and/or the storage device 16 may include random access memory (RAM), read only memory (ROM), rewritable non-volatile memory such as flash memory, hard drives, optical discs, or the like.

The electronic display 18 may be a self-emissive display, such as an organic light emitting diode (OLED) display, an LED display, or µLED display, or may be a liquid crystal display (LCD) illuminated by a backlight. In some embodiments, the electronic display 18 may include a touch screen, which may allow users to interact with a user interface of the electronic device 10. Additionally, the electronic display 18 may show foveated content.

The electronic display 18 may display various types of content. For example, the content may include a graphical user interface (GUI) for an operating system or an application interface, still images, video, or any combination thereof. The processor core complex 12 may supply or modify at least some of the content to be displayed.

The input structures 22 of the electronic device 10 may enable a user to interact with the electronic device 10 (e.g., pressing a button or icon to increase or decrease a volume level). The I/O interface 24 and the network interface 26 may enable the electronic device 10 to interface with various other electronic devices. The power source 28 may include any suitable source of power, such as a rechargeable lithium polymer (Li-poly) battery and/or an alternating current (AC) power converter.

The network interface 26 may include, for example, interfaces for a personal area network (PAN), such as a Bluetooth network, a local area network (LAN) or wireless local area network (WLAN), such as an 802.11x Wi-Fi network, and/or a wide area network (WAN), such as a cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra-wideband (UWB), alternating current (AC) power lines, and so forth.

The eye tracker 32 may measure positions and movement of one or both eyes of a person viewing the electronic display 18 of the electronic device 10. As used herein, the eye tracker 32 may be any suitable component for measuring and/or monitoring positions and/or movement of one or both eyes of a person viewing the electronic display 18 of the electronic device 10, such as a video camera, a light detection and ranging (LIDAR) sensor, a depth sensor, electrical potential sensors, and/or software recognition techniques. For instance, the eye tracker 32 may be a camera that records the movement of a viewer's eye(s) as the viewer looks at the electronic display 18. However, several different practices, techniques, and/or components may be employed to track a viewer's eye movements. For example, different types of infrared/near infrared eye tracking techniques such as bright-pupil tracking and dark-pupil tracking may be used. In these types of eye tracking, infrared or near infrared light is reflected off of one or both of the eyes of the viewer to create corneal reflections.

A vector between the center of the pupil of the eye and the conical reflections may be used to determine a point on the electronic display 18 at which the viewer is looking. Moreover, as discussed below, varying portions of the electronic display 18 may be used to show content in relatively higher and lower luminance level portions based at least in part on the point of the electronic display 18 at which the viewer is looking.

As will be described in more detail herein, the image processing circuitry 30 may perform particular image processing adjustments to counteract artifacts that may be observed when the eye tracker 32 tracks eye movement during foveation. For example, foveated areas rendered on the electronic display 18 may be dynamically adjusted (e.g., by size and/or position).

As discussed above, the electronic device 10 may be a computer, a portable electronic device, a wearable electronic device, or other type of electronic device. Example computers may include generally portable computers (such as laptop, notebook, and tablet computers) as well as computers that are generally used in one place (such as conventional desktop computers, workstations, and/or servers). In certain embodiments, the electronic device 10 in the form of a computer may be a model of a MacBook®, MacBook® Pro, MacBook Air®, iMac®, Mac® mini, or Mac Pro® available from Apple Inc. of Cupertino, Calif.

By way of example, the electronic device 10 depicted in FIG. 2 is a notebook computer 10A, in accordance with one embodiment of the present disclosure. The computer 10A includes a housing or enclosure 36, an electronic display 18, input structures 22, and ports of an I/O interface, such as the I/O interface 24 discussed with respect to FIG. 1. In one embodiment, a user of the computer 10A may use the input structures 22 (such as a keyboard and/or touchpad) to interact with the computer 10A, such as to start, control, or operate a GUI or applications running on the computer 10A. For example, a keyboard and/or touchpad may allow the user to navigate a user interface or application interface displayed on the electronic display 18. Additionally, the computer 10A may include an eye tracker 32, such as a camera.

FIG. 3 depicts a front view of a handheld device 10B, which represents one embodiment of the electronic device 10. The handheld device 10B may represent, for example, a portable phone, a media player, a personal data organizer, a handheld game platform, or any combination of such devices. By way of example, the handheld device 10B may be a model of an iPod® or iPhone® available from Apple Inc. The handheld device 10B includes an enclosure 36 to protect interior components from physical damage and to shield the interior components from electromagnetic interference. The enclosure 36 may surround the electronic display 18. The I/O interfaces 24 may be formed through the enclosure 36 and may include, for example, an I/O port for a hardwired connection for charging and/or content manipulation using a standard connector and protocol, such as the Lightning connector provided by Apple Inc., a universal serial bus (USB), or other similar connector and protocol. Moreover, the handheld device 10B may include an eye tracker 32.

The user input structures 22, in combination with the electronic display 18, may allow a user to control the handheld device 10B. For example, the input structures 22 may activate or deactivate the handheld device 10B, navigate a user interface to a home screen or a user-configurable application screen, and/or activate a voice-recognition feature of the handheld device 10B. Other input structures 22 may provide volume control, or toggle between vibrate and ring modes. The input structures 22 may also include a microphone to obtain a voice of the user for various voice-related features, and a speaker to enable audio playback and/or certain capabilities of the handheld device 10B. The input structures 22 may also include a headphone input to provide a connection to external speakers and/or headphones.

FIG. 4 depicts a front view of another handheld device 10C, which represents another embodiment of the electronic device 10 discussed with respect to FIG. 1. The handheld device 10C may represent, for example, a tablet computer or portable computing device. By way of example, the handheld device 10C may be a tablet-sized embodiment of the electronic device 10, which may be, for example, a model of an iPad® available from Apple Inc. The various components of the handheld device 10C may be similar to the components of the handheld device 10B discussed with respect to the FIG. 3. The handheld device 10C may include an eye tracker 32.

FIG. 5 depicts a computer 10D which represents another embodiment of the electronic device 10 discussed with respect to FIG. 1. The computer 10D may be any computer, such as a desktop computer, a server, or a notebook computer, but may also be a standalone media player or video gaming machine. By way of example, the computer 10D may be an iMac®, a MacBook®, or other similar device by Apple Inc. It should be noted that the computer 10D may also represent a personal computer (PC) by another manufacturer. The enclosure 36 of the computer 10D may be provided to protect and enclose internal components of the computer 10D, such as the electronic display 18. In certain embodiments, a user of the computer 10D may interact with the computer 10D using various peripheral input devices, such as input structures 22A and 22B (e.g., keyboard and mouse), which may connect to the computer 10D. Furthermore, the computer 10D may include an eye tracker 32.

Similarly, FIG. 6 depicts a wearable electronic device 10E representing another embodiment of the electronic device 10 of FIG. 1 that may be configured to operate using the techniques described herein. By way of example, the wearable electronic device 10E, which may include a wristband 43, may be an Apple Watch® by Apple Inc. However, in other embodiments, the wearable electronic device 10E may include any wearable electronic device such as, for example, a wearable exercise monitoring device (e.g., pedometer, accelerometer, heart rate monitor), or other device by another manufacturer. A similar enclosure 36 may be provided to protect and enclose internal components of the wearable electronic device 10E such as the display 18. The display 18 of the wearable electronic device 10E may include a touch screen display 18 (e.g., LCD, OLED display, active-matrix organic light emitting diode (AMOLED) display, and so forth), as well as input structures 22, which may allow users to interact with a user interface of the wearable electronic device 10E.

The electronic display 18 of the wearable electronic device 10E may be visible to a user when the electronic device 10E is worn by the user. Additionally, while the user is wearing the wearable electronic device 10E, an eye tracker (not shown) of the wearable electronic device 10E may track the movement of one or both of the eyes of the user.

The electronic display 18 of the electronic device 10 may show images or frames of content such as photographs, videos, and video games in a foveated manner Foveation refers to a technique in which an amount of detail, resolution, image quality, or brightness is varied across an image based at least in part on a fixation point, such as a point or area within the image itself, a point or region of the image on which a viewer's eyes are focused, or based at least in part on the gaze movement of the viewer's eyes. More specifically, the brightness can be varied by using different luminance levels in various portions of an image. For instance, in a first portion of the electronic display 18, one luminance level may be used to display one portion of an image, while a lower or higher luminance level may be used for a second portion of the image on the electronic display 18. The second portion of the electronic display 18 may be in a different area of the display 18 than the first area or may be located within the first area.

In some embodiments, the change in brightness or luminance level may be a gradual (i.e., smooth) transition from a central portion having a high luminance level to a peripheral edge of the foveated area. That is, for example, the luminance level of the foveated region may have a central portion with a high luminance. A luminance level of an outer portion of the foveated region may gradually decrease from an edge of the central region to an edge of the outer portion.

Figure 7:
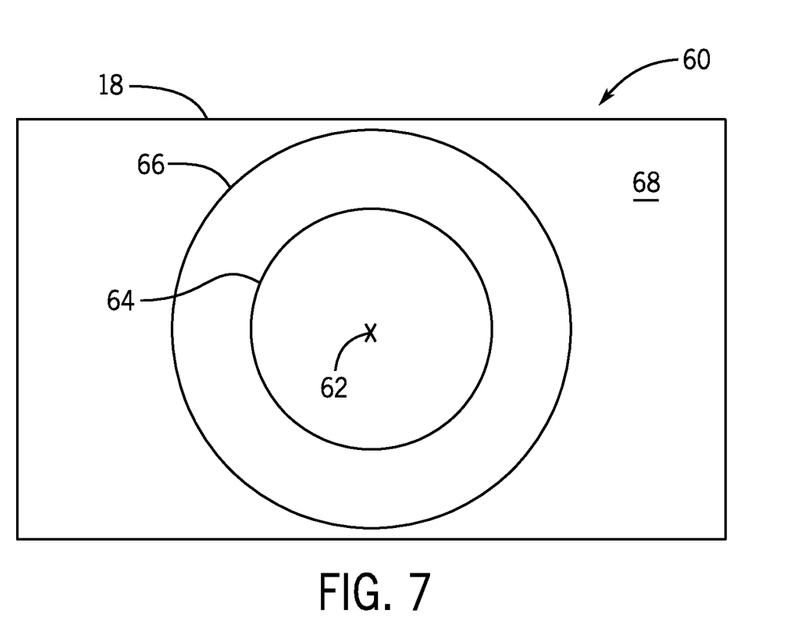
FIG. 7 is a diagram of the display of FIG. 1 using static foveation, according to an embodiment.

FIG. 7 is a diagram 60 representative of the electronic display 18 using static foveation. In static foveation, a size and/or a location of the various resolution areas of the electronic display 18 may be fixed. As shown, the electronic display 18 includes a higher luminance level area 64, a medium luminance level area 66, and a lower luminance level area 68 fixed about a centerpoint 62 of the display 18. Application of the foveation techniques described herein may adjust (e.g., increase and/or decrease) one or more luminance levels of one or more areas of the display 18 relative to a defined luminance level associated with the respective area of the display 18. A defined luminance level associated with each of the areas 64, 66, 68 may be a luminance level associated with image content before application of foveation techniques. In one particular example, the defined luminance level of the areas 64, 66, and 68 may be a maximum luminance of the display (e.g., all white pixels at maximum brightness) if foveation were not used. With foveation, the adjusted luminance of the area 64 may be 100 percent of defined luminance level, the adjusted luminance of the area 66 may be eighty percent of the defined luminance level, and the luminance level of the area 68 may be sixty percent of the defined luminance level of the display 18.

To reiterate, the adjusted luminance levels of the areas 64, 66, and 68 are relative to the defined luminance levels of the areas 64, 66, and 68, respectively. The defined luminance thus may change depending on the content of the image data. The medium luminance level area 66 may have a lower luminance level than a defined luminance level of the same area. Similarly, the luminance level of the lower luminance level area 68 may be lower than the defined luminance level of the same area. Finally, the luminance level of the higher luminance level area 64 may be the same, lower, or even higher than the defined luminance level of the same area. In certain embodiments, the adjusted luminance level of an area further from the centerpoint 62 may be adjusted more (e.g., further reduced) than an adjusted luminance level of an area closer to the centerpoint 62. Additionally or alternatively, the adjusted luminance level of an area further from the centerpoint 62 may be adjusted less (e.g., reduced to a lesser extent) than an adjusted luminance level of an area closer to the centerpoint 62.

As one example, an adjusted luminance level of the lower luminance level area 68 may be between forty to sixty percent of a defined luminance level of an original image brightness associated with the area 68. That is, the adjusted luminance level may be between forty to sixty percent of the defined luminance level (e.g., sixty percent of the maximum luminance level) of the display, as described in the example above. An adjusted luminance level of the medium luminance level area 66 may be between sixty to eighty percent of a defined luminance level of an original image brightness associated with the area 66 and a luminance level of the higher luminance level area 64 may be between eighty to one hundred percent of a defined luminance level of an original image brightness associated with the area 64. As illustrated in FIG. 7, three areas 64, 66, 68 may be formed from concentric circles about the centerpoint 62. While three areas are illustrated in FIG. 7, it should be understood that there may be two or more areas (e.g., a higher luminance level area and a lower luminance level area) of the electronic display 18. Moreover, in some examples, the luminance may be adjusted according to any suitable function that reduces the brightness of image data based at least in part on the distance of image pixels from the centerpoint 62.

As described above, electronic displays such as the electronic display 18 may also use dynamic foveation. In dynamic foveation, the areas of the electronic display 18 at which the various luminance levels are used may change between two or more images based at least in part on the focal point of the eyes of the user. As an example, content that uses multiple images, such as videos and video games, may be presented to viewers by displaying the images in rapid succession. The portions of the electronic display 18 in which the content is displayed with a relatively high luminance level and a relatively low luminance level may change, for instance, based at least in part on data collected by the eye tracker 32 which indicates a focal point on the electronic display 18 of the eyes of the user.

Figure 8:
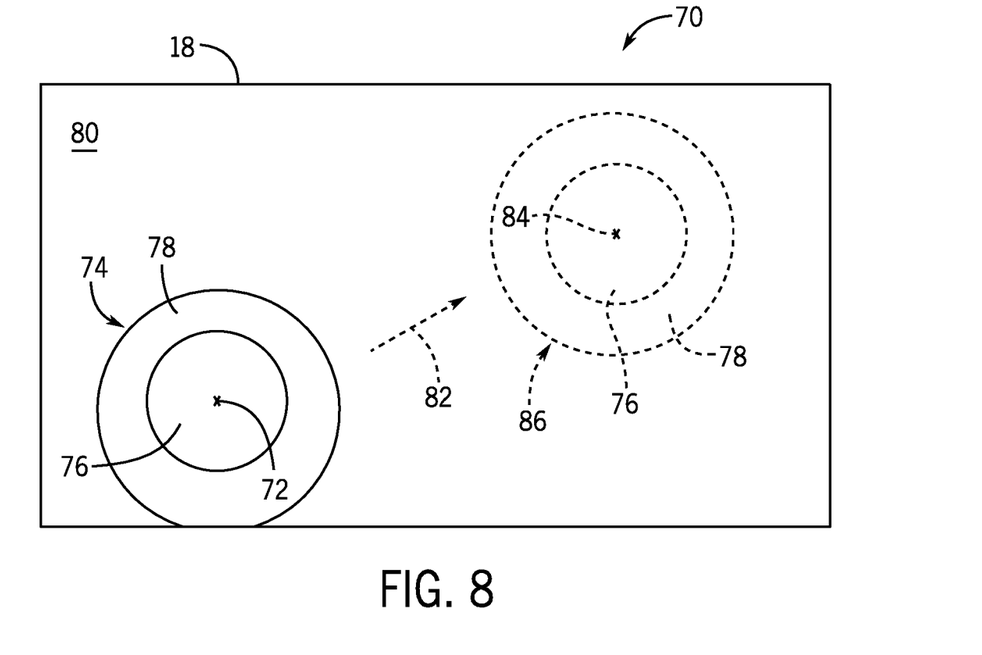
FIG. 8 is a diagram of the display of FIG. 1 using dynamic foveation, according to an embodiment.

FIG. 8 is a diagram 70 that illustrates the electronic display 18 using dynamic foveation. The diagram 70 includes a first frame 74 and a second frame 86 each having a higher luminance level area 76, a medium luminance level area 78, and a lower luminance level area 80. The first frame 74 and the second frame 86 each may represent a different portion of a single content frame (e.g., a different portion of a single image) or each may represent a different content frame of consecutive content frames (e.g., content frames of a video). In some instances, transitional frames between these frames provide a smooth movement of the frames 74 and 86 corresponding to tracked movement 82 of the eyes of the user from a first location 72 associated with the first frame 74 and a second location 84 associated with the second frame 86. The higher luminance level area 76, the medium luminance level area 78, and the lower luminance level area 80 each may correspond to the higher luminance level area 64, the medium luminance level area 66, and the lower luminance level area 68 discussed with respect to FIG. 7.

The frames 74 and 86 are in different locations on the electronic display 18 based at least in part on a focal point of the eyes of the user. During a transition from the first frame 74 to the second frame 86 (or when the focal point of the eyes of the user move from the first location 72 of the first frame 74 to the second location 84 of the second frame 86), the higher luminance level area 76 and medium luminance level area 78 are moved from near a bottom left corner of the electronic display 18 to a top right corner of the electronic display 18.

A foveated display may also be adjusted using temporal filtering. For example, a gaze of a user may shift locations on the display and may move through areas of varying luminance levels. Techniques using temporal filtering while using dynamic foveation may provide luminance level adjustments without being perceived by the user. That is, the adjustment may be performed without being visible to the user looking at the electronic device.

Figure 9:
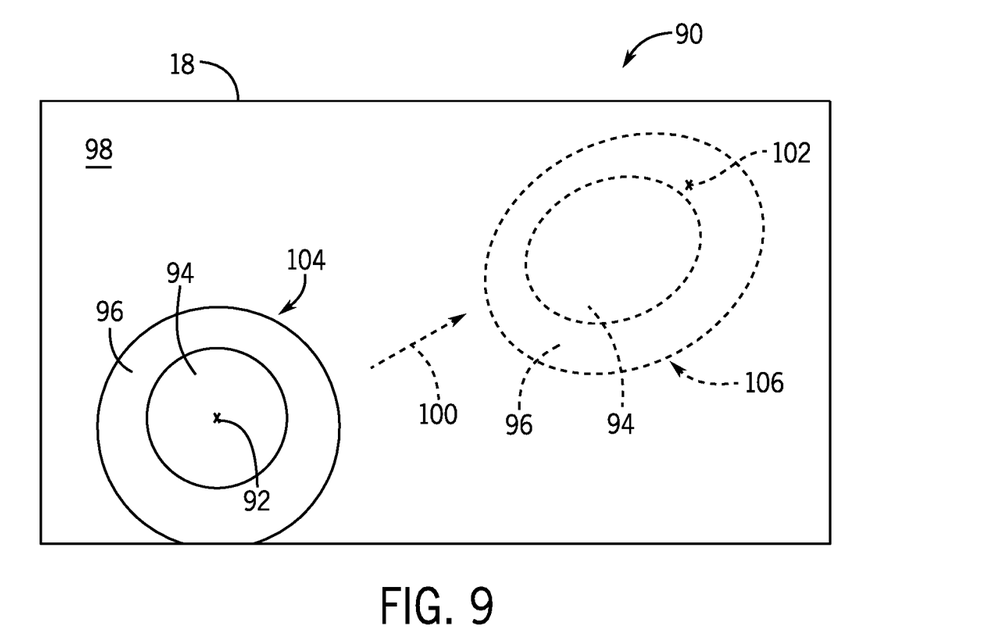
FIG. 9 is a diagram of the display of FIG. 1 using dynamic foveation and temporal filtering, according to an embodiment.

FIG. 9 is a diagram 90 that illustrates the electronic display 18 using dynamic foveation and temporal filtering. The diagram 90 includes a first frame 104 and a second frame 106 each having a higher luminance level area 94, a medium luminance level area 96, and a lower luminance level area 98. The first frame 104 and the second frame 106 each may correspond to the first frame 74 and the second frame 86 discussed with respect to FIG. 8. In this case, the eye tracking system may detect a movement 100 of a gaze of the user. For example, the eye tracking system may detect the movement 100 of the eyes of the user from a first location 92 associated with the first frame 104 to a second location 102 associated with the second frame 106. When the focal point of the eyes of the user moves from the first location 92 of the first frame 104 to the second location 102 of the second frame 106, the higher luminance level area 94 and medium luminance level area 96 are moved from near a bottom left corner of the electronic display 18 to a top right corner of the electronic display 18.

If the eye tracking system detects movement of the gaze of the user, the foveated display system may cause display artifacts to be visible or perceived by the user which negatively affect the experience of the user. The artifacts may include low luminance levels at the focal point of the eyes of the user, intermittent switching between high luminance levels and low luminance levels due to sudden movement of the foveated areas of the display, and flashing resulting from sudden luminance level changes at various areas of the display. Thus, inefficient eye tracking techniques may cause foveation errors (e.g., temporal flashing) on the electronic display to be visible to the user and may deteriorate the experience of the user looking at the electronic display.

To prevent foveation errors and temporal flashing from being visible, techniques described herein alter a brightness, a size, and/or a location of the foveated areas (e.g., the higher luminance level area 94, the medium luminance level area 96, and the lower luminance level area 98 discussed with respect to FIG. 9) so that a focal point of the user's eyes stay within the foveated areas regardless of where the focal point of the user's eyes moves to on the electronic display 18. The techniques described herein also provide a smooth transition between dynamic foveation (during normal functioning of the eye tracking system) to static foveation, such that an occurrence of temporal flashing or sudden changes in luminance levels are not apparent to the user. This may improve the experience of the user of the electronic device when eye tracking occurs.

In some embodiments, eye tracking may result in changes to a size of one or more foveal areas (e.g., expansion or reduction). A size of the foveal area may expand to provide a smooth transition and/or reduce instances of temporal flashing or changes in luminance levels. A size expansion profile for the foveal area may be determined based at least in part on statistical data corresponding to a speed of gaze movement, a direction of gaze movement, a distance of gaze movement, and/or any other suitable eye tracking attribute.

In certain embodiments, a brightness, a size, and/or a location of the foveal area may be determined based on a previous frame, such as first frame 104, and a target frame, such as second frame 86 in FIG. 8. A previous gaze location, such as first location 92, may be associated with the previous frame and a target gaze location, such as second location 84 in FIG. 8 or second location 102, may be associated with the target frame. Additionally or alternatively, one or more intermediate frames may be displayed between the previous frame and the target frame. In some embodiments, the one or more intermediate frames may be an average of the previous frame and the target frame. As such, the one or more intermediate frames may have one or more foveated areas and the one or more corresponding foveated areas may have corresponding centerpoints evenly distributed between the previous gaze location and the target gaze location. Additionally or alternatively, the one or more intermediate frames may include corresponding one or more luminance level areas, such as higher luminance level area 94, medium luminance level area 96, and lower luminance level area 98. In certain embodiments, one or more luminance level areas of the one or more intermediate frames may be elongated and/or expanded in relation to the one or more luminance level areas of the previous frame, such as first frame 104, and/or the target frame, such as second frame 86 in FIG. 8. The techniques described herein provide a smooth transition, such that an occurrence of temporal flashing or sudden changes in luminance levels are not apparent to the user. This may improve the experience of the user of the electronic device when eye tracking occurs.

Figure 10:
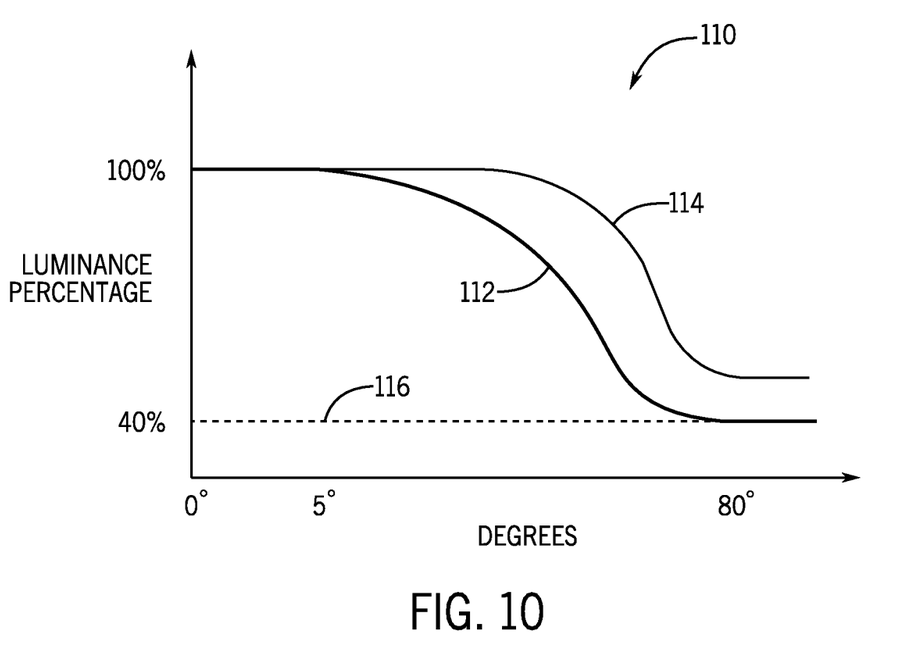
FIG. 10 illustrates a graph for a brightness level of a foveated portion of a display, according to an embodiment.

FIG. 10 illustrates a graph 110 depicting luminance functions for different content displayed on an electronic display, such as the electronic display 18 discussed above, according to one aspect of the disclosure. The graph 110 has a horizontal axis depicting a visual angle in degrees of arc. The visual angle corresponds to an angle formed between a first line extending from an eye of the user towards a focal point of the gaze of the user on an electronic display and a second line extending from the eye of the user towards another point on the electronic display. The graph 110 has a vertical axis depicting a percentage of a maximum luminance level associated with a content frame displayed on an electronic display. Spatial frequency is an attribute of an image frame corresponding to an amount of content depicted in the image frame. Contrast masking may occur when visibility of a visual stimulus is attenuated by the presence of another nearby visual stimulus. Contrast masking may be provided by using differing colors, differing spatial orientations, differing spatial frequencies, and any other suitable contrast masking techniques. Thus, image frames having high spatial frequency may mask differing luminance levels better than image frames with low spatial frequency.

To prevent differing luminance levels from being visible and deteriorating an experience of the user, techniques described herein provide multiple luminance functions depending on the spatial frequency of the image frame so that a high spatial frequency image frame masks more widely varying luminance levels than a lower spatial frequency image frame. In one embodiment, a first line 112 indicates a luminance function associated with a high frequency image frame. As shown, the first line 112 has a highest luminance level at a minimum visual angle and the luminance level decreases as the visual angle increases. In certain embodiments, the graph 110 may include a line 116 that corresponds to a minimum luminance level displayed by the electronic display. In one embodiment, a second line 114 indicates a luminance function associated with low frequency image content. As shown, the luminance level of the second line 114 decreases more slowly than the luminance level of the first line 112 and the first line 112 reaches lower luminance levels than the second line 114. Thus, image frames having high spatial frequencies may use luminance functions having a wider range of luminance levels and/or steeper variations between luminance levels. Additionally or alternatively, contrast masking may be provided by differing colors, differing spatial orientations, or any other suitable technique of contrast masking. In this way, the techniques described herein improve the experience of the user of the electronic device by adjusting luminance levels according to spatial frequency of a displayed image frame on an electronic display.

Figure 11:
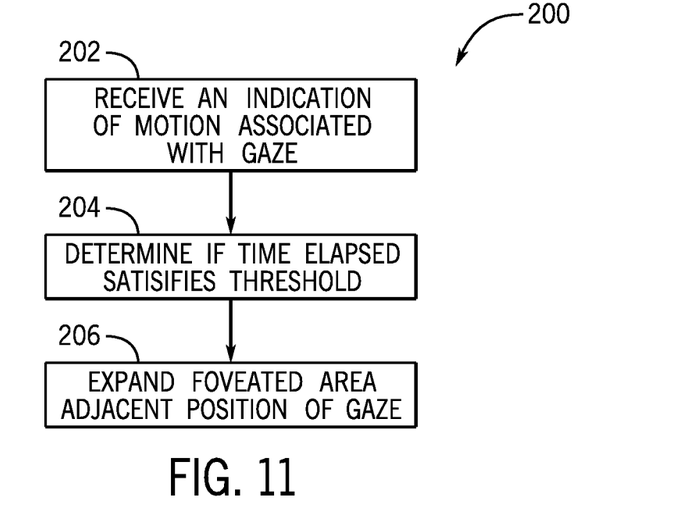
FIG. 11 illustrates a flow chart depicting operations to adjust a foveated portion of a display and use temporal filtering, according to an embodiment.

FIG. 11 is a flow chart 200 depicting operations to adjust a foveated portion of an electronic display and use temporal filtering, according to an embodiment. The operations depicted in the flow chart 200 may be performed or executed by one or more components of the electronic device 10 described with respect to FIG. 1, including the processor core complex 12. The flow chart 200 may include one or more operations corresponding to foveation and temporal filtering of the electronic display discussed with respect to FIGS. 8 and 9.

At operation 202, an indication of motion is received from the eye tracking system, such as the eye tracker 32 in FIG. 1. The indication may be associated with a gaze of the user and may include a direction of motion, a velocity of motion, an initial position, a final position, and/or a total distance. The indication may signal to the processor core complex 12 that adjusting the foveated display and temporal filtering should begin.

At operation 204, the processor core complex 12 determines if a time elapsed since the indication of motion from the eye tracking system satisfies a time threshold. If the time threshold is not satisfied, the foveated areas may not be adjusted. If the time threshold is satisfied, the foveated areas are moved toward the final position of the gaze of the user of the electronic display, as discussed with respect to FIGS. 8 and 9.

At operation 206, the foveated area(s) of the electronic display are expanded about the final position of the focal point of the user's eyes. Additionally or alternatively, the processor core complex 12 may expand the foveated area(s) of the electronic display based on the indication of motion, without satisfying a time threshold. In certain embodiments, the processor core complex 12 may adjust the foveated area(s) by generating one or more intermediate frames between a previous frame and a target frame, as discussed with respect to FIGS. 8 and 9.

Figure 12:
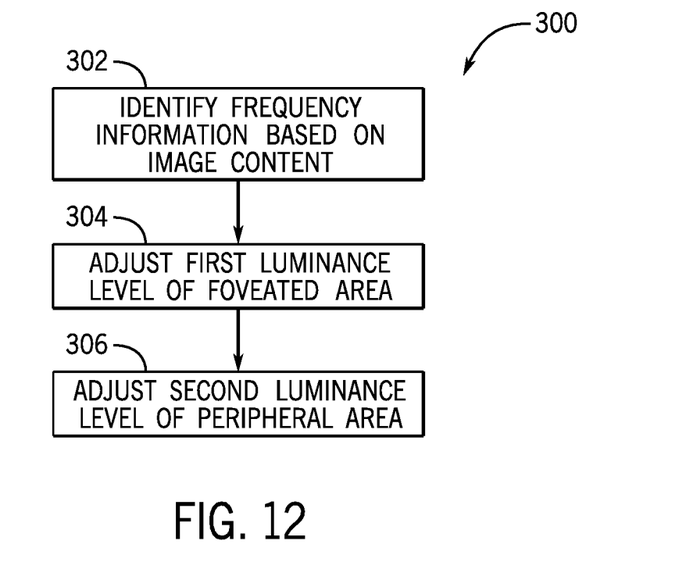
FIG. 12 illustrates a flow chart depicting operations to adjust a foveated portion of a display based at least in part on image content, according to an embodiment.

FIG. 12 is a flow chart 300 depicting operations to adjust luminance levels of portions of an electronic display based at least in part on image content, according to an embodiment. The operations depicted in the flow chart 200 may be performed or executed by one or more components of the electronic device 10 described with respect to FIG. 1, including the processor core complex 12. The flow chart 300 may include one or more operations corresponding to adjusting luminance levels of the electronic display discussed with respect to FIGS. 8 and 9. The flow chart 300 begins at operation 302 where a set of spatial frequency information is identified based at least in part on the image content being displayed on an electronic display, such as electronic display 18. The set of frequency information may be used to select a corresponding luminance level function for the electronic display discussed with respect to FIG. 10. In one example, the line 114 of FIG. 10 may be selected for lower spatial frequency image content and the line 112 of FIG. 10 may be selected for higher spatial frequency image content. In another example, the line 114 of FIG. 10 may be selected for higher spatial frequency image content and the line 112 of FIG. 10 may be selected for lower spatial frequency image content.

At operation 304, the luminance level of a foveated area may be adjusted according to the luminance level function selected. That is, the luminance level may be adjusted in the foveated area according to the luminance level specified by the selected luminance level function at a visual angle corresponding to the foveated area.

At operation 306, the luminance level of a peripheral area may be adjusted according to the luminance level function selected. As such, the luminance level of the peripheral area may be adjusted according to the luminance level specified by the selected luminance level function at a visual angle corresponding to the peripheral area. Additionally or alternatively, a size of the foveated area may be adjusted using the frequency information of the image. In one example, the foveal area may be selected to be larger for higher-frequency image information and may be selected to be smaller for lower-frequency image information. In another example, the foveal area may be selected to be smaller for higher-frequency image information and may be selected to be larger for lower-frequency image information. Additionally or alternatively, the luminance level of the peripheral area may be adjusted in response to updating the image content displayed on an electronic display. For example, a first image content may have a higher spatial frequency than a spatial frequency of a subsequent image content. As such, the luminance levels of one or more areas (e.g., peripheral area, foveated area) may be adjusted (e.g., raised or lowered) to accommodate for the change in spatial frequency between the first image content and the subsequent image content.

Figure 13:
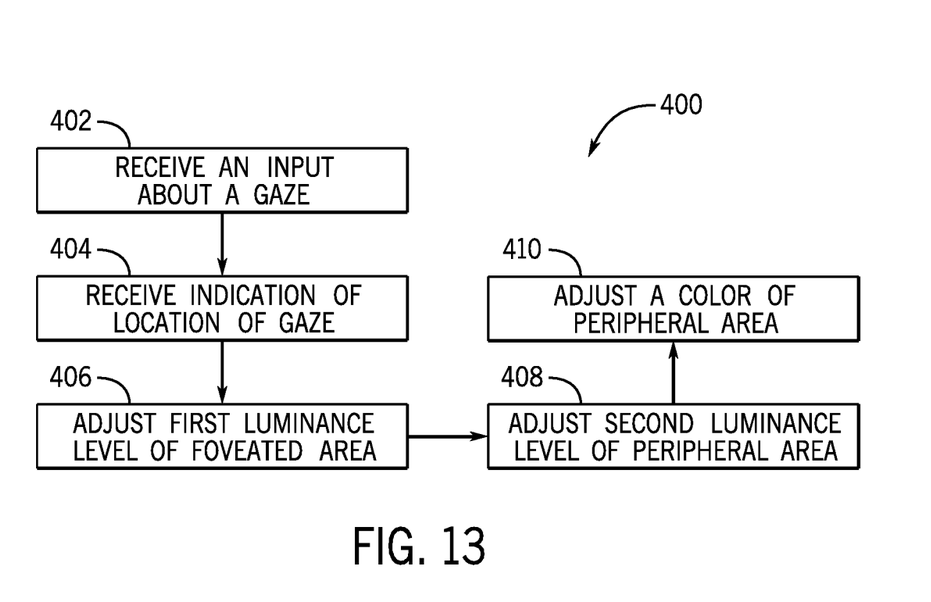
FIG. 13 is a flow chart depicting operations to adjust a luminance level and a color of a foveated portion of a display, according to an embodiment.

FIG. 13 is a flow chart 400 depicting operations to adjust luminance levels and colors of portions of an electronic display, according to an embodiment. While the operations depicted in the flow chart 400 are described as being performed or executed by one or more components of the electronic device 10, such as the processor core complex 12, it should be understood that the operations may be performed by any suitable processing circuitry, such as image processing circuitry 30. The processor core complex 12 may include any suitable data processing circuitry to perform these operations, such as one or more microprocessors, one or more application specific processors (ASICs), or one or more programmable logic devices (PLDs). In some cases, the processor core complex 12 may execute programs or instructions (e.g., an operating system or application) stored on a suitable storage apparatus, such as the local memory 14 and/or the storage device 16. The flow chart 400 may include one or more operations corresponding to adjusting luminance levels of the electronic display discussed with respect to FIGS. 8 and 9. The flow chart 400 begins at operation 402 where an input is received associated with a gaze of a user from the eye tracking system. For example, the input may be associated with a movement of the gaze of the user. At operation 404, the location of the gaze on an electronic display is received. In some embodiments, the location of the gaze may be a final position after movement of the gaze.

At operation 406 and 408, the processor core complex 12 determines if a time elapsed since the input from the eye tracking system satisfies a time threshold. If the time threshold is not satisfied, the luminance levels of the foveated areas may not be adjusted. If the time threshold is satisfied, the luminance levels of the foveated areas are adjusted about the final position of the gaze of the user of the electronic display, as discussed with respect to FIGS. 8 and 9.

At operation 410, a color of a peripheral area of the display may be adjusted. For example, the color of the peripheral area may be green-shifted to reduce a power usage of the electronic display. Indeed, all of the various power-saving foveation techniques discussed above may be used individually or in combination with one another. For example, the peripheral areas of the electronic display may be green-shifted and the brightness may be reduced.

As may be appreciated, though the current embodiments refer to movement of the foveated areas toward the center of the display, movement of the foveated area toward other portions of the display could be performed in other embodiments. For example, based upon contextual (e.g., saliency) information of the images displayed on the display, it may be more likely that the focus of the eyes of the user will be at another part of the display (e.g., a more salient area of the display). A salient area of the display may be considered an area of interest based at least in part on the image content. The focal point of the eyes of the user may be drawn to the salient area of the display based at least in part on the content.

When a likely focus area is known, it may be prudent to default movement of the foveated areas toward that portion of the display rather than the center of the display. Thus, in an example where the images displayed have dynamic movement only in the upper right corner (i.e., other portions of the images in the display are still—this may be referred to as "saliency by the effect of movement"), the likely focal area may be the area where dynamic movement is being rendered. Accordingly, in this example the movement of the foveated areas may be toward the upper right corner (i.e., toward the dynamic movement being rendered).

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

What is claimed is:

1. An electronic device, comprising:
a display comprising one or more foveated areas, a first area having a first luminance and a second area having a second luminance;
an eye tracker configured to collect eye tracking data regarding a gaze of one or more eyes of a user on the display; and
processing circuitry operatively coupled to the display and configured to:
receive an indication of a motion associated with the gaze from the eye tracker;
determine a previous location associated with the gaze during a previous frame and a target position associated with the gaze during a target frame; and
expand one or more foveated areas of the display adjacent a previous position of the gaze of the user, wherein a rate at which the one or more foveated areas expand is based at least in part on a speed of the gaze of the user, a location of the gaze of the user on the display, a type of content being displayed, a size of the display, or a size of the one or more foveated areas, or any combination thereof.

2. The electronic device of claim 1, wherein the display comprises a plurality of pixels, wherein each of the first area and the second area is rendered by a subset of the plurality of pixels.

3. The electronic device of claim 1, wherein the processing circuitry is configured to receive a direction of the gaze of the user from the eye tracker.

4. The electronic device of claim 3, wherein the processing circuitry is configured to expand the one or more foveated areas in the direction based at least in part on the gaze of the user.

5. The electronic device of claim 1, wherein the processing circuitry is configured to adjust a parameter of the one or more foveated areas based at least in part on frequency information of image content to be rendered on the display.

6. The electronic device of claim 1, wherein the processing circuitry is configured to:
receive a second indication of an error associated with the gaze from the eye tracker; and
in response to the second indication of the error, expand one or more foveated areas of the display adjacent a last known position of the gaze of the user.

7. A non-transitory, computer-readable medium storing instructions that, when executed by a processor, cause the processor to:
identify a set of frequency information based at least in part on image content rendered on a display during an update of the image content;
in response to the identification of the set of frequency information:
select a luminance function based at least in part on the set of frequency information;
adjust a first luminance level of a foveated area of the display based at least in part on the selected luminance function; and
adjust a second luminance level of a peripheral area of the display based at least in part on the selected luminance function, wherein the second luminance level is dimmer than the first luminance level.

8. The non-transitory computer-readable medium of claim 7, wherein the foveated area is positioned within the peripheral area, and wherein a luminance of the peripheral area tapers from a higher luminance near the foveated area to a lower luminance at a periphery of the peripheral area.

9. The non-transitory computer-readable medium of claim 7, wherein the set of frequency information is associated with a spatial frequency of the image content.

10. The non-transitory computer-readable medium of claim 7, wherein the instructions cause the processor to adjust a color of the peripheral area of the display based at least in part on the set of frequency information.

11. The non-transitory computer-readable medium of claim 10, wherein the instructions cause the processor to shift the color of the peripheral area towards green.

12. The non-transitory computer-readable medium of claim 7, wherein the instructions cause the processor to:
in response to the identification of the set of frequency information:
adjust a third luminance level of a second foveated area of the display based at least in part on the set of frequency information, wherein the second foveated area is positioned within the foveated area.

13. The non-transitory computer-readable medium of claim 7, wherein the instructions cause the processor to:
identify a second set of frequency information based at least in part on a second image content rendered on the display, wherein the second set of frequency information is associated with a lower spatial frequency than the set of frequency information; and in response to the identification of the second set of frequency information, raise the second luminance level of the peripheral area of the display.

14. The non-transitory, computer-readable medium of claim 7, wherein the selected luminance function comprises a minimum luminance level associated with a maximum visual angle.

15. A method comprising:
receiving an input regarding a gaze of a user on a display;
receiving an indication of a location of the gaze from an eye tracker; and
in response to receiving the indication of the location:
adjusting, at a rate, one or more foveated areas of the display adjacent a previous location of the gaze of the user at least in part by:
adjusting a first luminance level of a foveated area of the display about the location of the gaze; and
adjusting a second luminance level of a peripheral area of the display, wherein the rate at which the one or more foveated areas are adjusted is based at least in part on a speed of the gaze of the user, a location of the gaze of the user on the display, a type of content being displayed, a size of the display, or a size of the one or more foveated areas, or any combination thereof.

16. The method of claim 15, wherein the first luminance level differs from the second luminance level.

17. The method of claim 15, wherein adjusting the one or more foveated areas comprises shifting a color of the peripheral area towards green.

18. The method of claim 15, comprising adjusting a color of a second foveated area of the display, wherein the foveated area is positioned within the second foveated area.

19. The method of claim 15, wherein the foveated area is positioned within the peripheral area, and wherein a color corresponding to the peripheral area tapers from a lower green level near the foveated area to a higher green level at a periphery of the peripheral area.

20. The method of claim 15, wherein a center of the display is within the foveated area.

* * * * *